(12) United States Patent
Cho et al.

(10) Patent No.: US 10,447,898 B2
(45) Date of Patent: Oct. 15, 2019

(54) IMAGE SENSORS INCLUDING RIPPLE VOLTAGE COMPENSATION

(71) Applicant: Samsung Electronics Co., Ltd., Suwon-si, Gyeonggi-do (KR)

(72) Inventors: Kyu Ik Cho, Hwaseong-si (KR); Ji Yong Kim, Gimpo-si (KR); Jae Jung Park, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 184 days.

(21) Appl. No.: 15/617,516

(22) Filed: Jun. 8, 2017

(65) Prior Publication Data

US 2017/0359492 A1 Dec. 14, 2017

(30) Foreign Application Priority Data

Jun. 8, 2016 (KR) .......................... 10-2016-0071116

(51) Int. Cl.
*H04N 3/14* (2006.01)
*H04N 5/369* (2011.01)
*H04N 5/3745* (2011.01)
*H04N 5/335* (2011.01)
*H04N 5/341* (2011.01)

(52) U.S. Cl.
CPC ........... *H04N 3/155* (2013.01); *H04N 3/1568* (2013.01); *H04N 5/3698* (2013.01); *H04N 5/3745* (2013.01); *H04N 5/335* (2013.01); *H04N 5/341* (2013.01)

(58) Field of Classification Search
CPC ...... H04N 3/155; H04N 3/1568; H04N 5/341; H04N 5/363; H04N 5/3745

USPC ........................................... 250/208.1, 214.1
See application file for complete search history.

(56) References Cited

U.S. PATENT DOCUMENTS

| 7,408,138 | B2 | 8/2008 | Lee |
| 7,732,748 | B2 | 6/2010 | Johansson |
| 8,149,309 | B2 | 4/2012 | Tanaka |
| 8,174,422 | B2 | 5/2012 | Okamoto et al. |
| 8,531,591 | B2 | 9/2013 | Okamoto et al. |
| 8,605,173 | B2 | 12/2013 | Lee et al. |
| 9,148,596 | B1 | 9/2015 | Sun et al. |
| 2007/0046513 | A1* | 3/2007 | Ham ...................... H03M 1/58 341/118 |
| 2015/0264284 | A1 | 9/2015 | Yoo |

(Continued)

FOREIGN PATENT DOCUMENTS

JP 2009/118035 5/2009

*Primary Examiner* — Kevin K Pyo
(74) *Attorney, Agent, or Firm* — Myers Bigel, P.A.

(57) ABSTRACT

An image sensor is provided. The image sensor may include an active pixel electrically connected to a column line and configured to provide an output voltage to a pixel node and a bias circuit electrically connected between the pixel node and an earth terminal, and in which a first current flows through a first line electrically connected to the pixel node, wherein the bias circuit includes a first variable capacitor electrically connected to a power supply voltage, and a second variable capacitor electrically connected to the earth terminal, and the magnitude of the first current may be configured to vary based on a ratio of a capacitance of the first variable capacitor to a capacitance of the second variable capacitor. The output voltage may be configured to be adjusted based on the magnitude of the first current.

19 Claims, 18 Drawing Sheets

(56) References Cited

U.S. PATENT DOCUMENTS

2015/0288902 A1 10/2015 Sun et al.
2015/0326804 A1 11/2015 Lee
2018/0205903 A1* 7/2018 Ko ..................... H04N 5/37455

* cited by examiner

FIG. 3C

| TUNE<2> | TUNE<1> | TUNE<0> | C1/(C1+C2) |
|---|---|---|---|
| 1 | 1 | 1 | 0 |
| 1 | 1 | 0 | 1/7 |
| 1 | 0 | 1 | 2/7 |
| 1 | 0 | 0 | 3/7 |
| 0 | 1 | 1 | 4/7 |
| 0 | 1 | 0 | 5/7 |
| 0 | 0 | 1 | 6/7 |
| 0 | 0 | 0 | 1 |

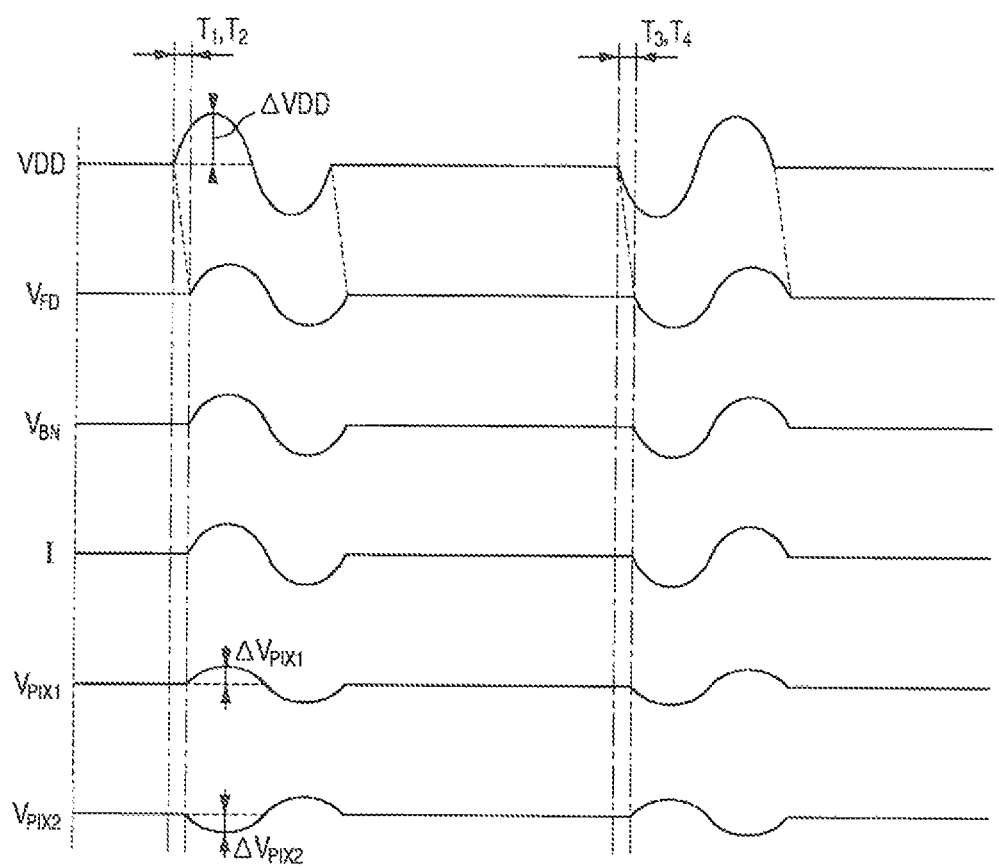

FIG. 10C

| T_P<3> | T_P<2> | T_P<1> | T_P<0> | C3/(C3+C4) |
|---|---|---|---|---|
| 1 | 1 | 1 | 1 | 0 |
| 1 | 1 | 1 | 0 | 1/15 |
| 1 | 1 | 0 | 1 | 2/15 |
| 1 | 1 | 0 | 0 | 3/15 |
| 1 | 0 | 1 | 1 | 4/15 |
| 1 | 0 | 1 | 0 | 5/15 |
| 1 | 0 | 0 | 1 | 6/15 |
| 1 | 0 | 0 | 0 | 7/15 |
| 0 | 1 | 1 | 1 | 8/15 |
| 0 | 1 | 1 | 0 | 9/15 |
| 0 | 1 | 0 | 1 | 10/15 |
| 0 | 1 | 0 | 0 | 11/15 |
| 0 | 0 | 1 | 1 | 12/15 |
| 0 | 0 | 1 | 0 | 13/15 |
| 0 | 0 | 0 | 1 | 14/15 |
| 0 | 0 | 0 | 0 | 1 |

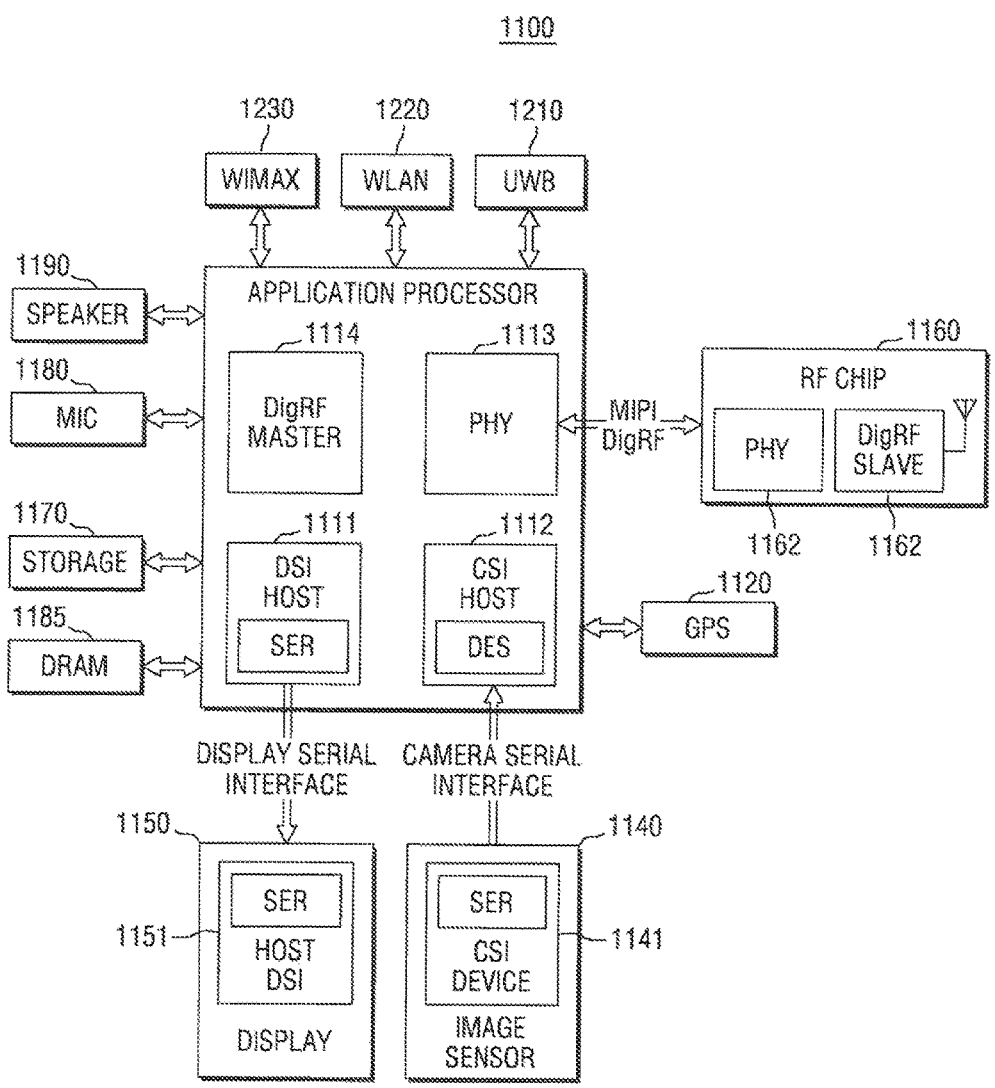

IMAGE SENSORS INCLUDING RIPPLE VOLTAGE COMPENSATION

This application claims priority under 35 U.S.C. § 119 to Korean Patent Application No. 10-2016-0071116, filed on Jun. 8, 2016 in the Korean Intellectual Property Office, the contents of which are hereby incorporated herein by reference in their entirety.

BACKGROUND

1. Field

Embodiments of the inventive concepts relate to image sensors and, more particularly, to image sensors with ripple voltage compensation.

2. Description of the Related Art

Image sensors convert optical images into electrical signals. With the development of computer and communication industries, the demand for image sensors having improved performance has increased in various fields, such as digital cameras, camcorders, personal communication systems (PCS), game appliances, security cameras, and medical microcameras.

SUMMARY

Embodiments of the inventive concepts may provide image sensors that include circuits that are capable of compensating for noises that may be included in a power supply voltage.

According to some embodiments of the inventive concepts, image sensors may be provided. An image sensor may include an active pixel electrically connected to a column line and configured to provide an output voltage to a pixel node and may include a bias circuit electrically connected between the pixel node and an earth terminal. A first current may flow in the bias circuit through a first line electrically connected with the pixel node. The bias circuit may include a first variable capacitor electrically connected to a power supply voltage and may include a second variable capacitor electrically connected to the earth terminal. A magnitude of the first current may be configured to vary based on a ratio of a capacitance of the first variable capacitor to a capacitance of the second variable capacitor. The output voltage may be configured to be adjusted based on the magnitude of the first current.

According to some embodiments of the inventive concepts, image sensors may be provided. An image sensor may include a column line electrically connected to output nodes of a plurality of active pixels and may include a bias circuit electrically connected to the column line. The bias circuit may include a first variable capacitor and a second variable capacitor electrically connected to each other. Other sides of the first and second variable capacitors may be respectively electrically connected to a first voltage and a second voltage. The bias circuit may be configured to generate a compensation voltage configured to compensate for a ripple voltage of a power supply voltage. The bias circuit may be configured to supply the compensation voltage to the output node.

According to some embodiments of the inventive concepts, image sensors may be provided. An image sensor may include a plurality of pixels electrically connected to a power supply voltage and are configured to output an output voltage to a pixel node via a column line. The image sensor may include a bias circuit configured to vary a bias current based on a ripple voltage of the power supply. The bias circuit may be configured to provide the varied bias current to the pixel node. The bias circuit may include a first capacitor electrically connected between the power supply voltage and a first node and a second capacitor electrically connected between an earth terminal and the first node. At least one of the first and second capacitors may be a variable capacitor configured to adjust a magnitude of the variance of the bias current.

BRIEF DESCRIPTION OF THE DRAWINGS

The above and other aspects and features of the embodiments of the inventive concepts will become more apparent in view of the attached drawings and accompanying detailed description.

FIG. 3C is a diagram illustrating operation of the variable capacitor of FIG. 3B according to some embodiments of the inventive concepts.

FIG. 5 is a timing chart illustrating an operation of an image sensor according to some embodiments of the inventive concepts.

FIG. 10C is a diagram illustrating operation of the variable capacitor of FIG. 10B.

FIG. 14 is a block diagram illustrating an example of the interfaces used in the computing system of FIG. 13 according to some embodiments of the inventive concepts.

DETAILED DESCRIPTION OF THE EMBODIMENTS

Figure 1:
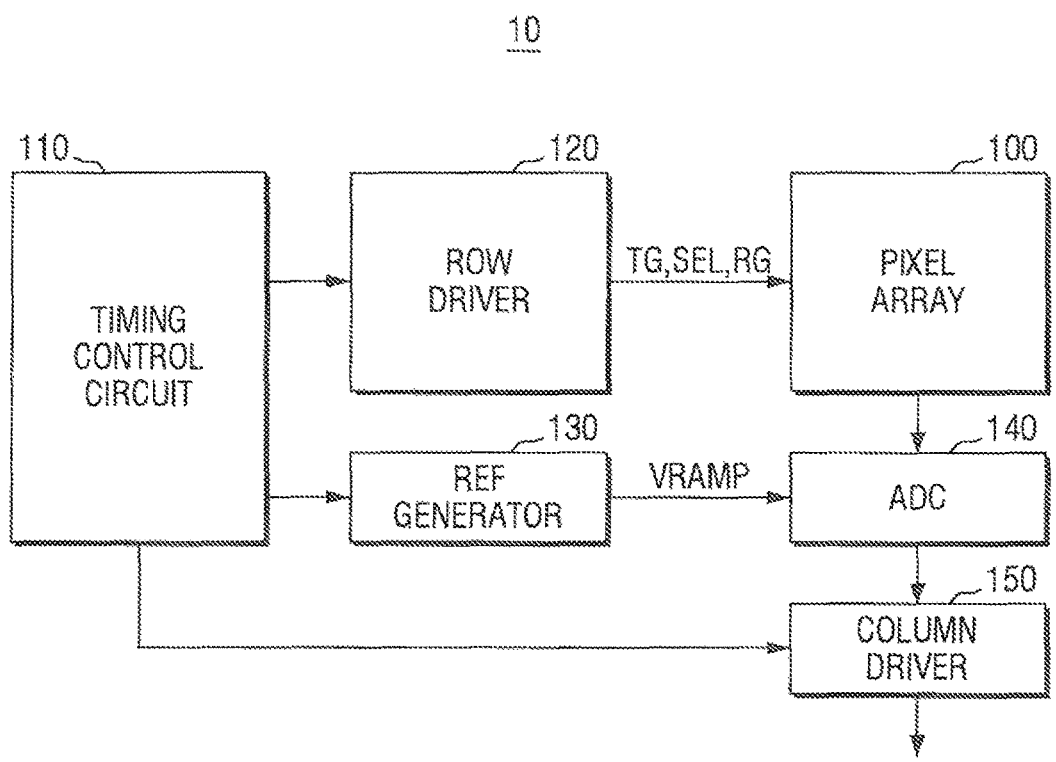
FIG. 1 is a block diagram illustrating an image sensor according to some embodiments of the inventive concepts.

The inventive concepts will now be described more fully hereinafter with reference to the accompanying drawings, in which exemplary embodiments of the inventive concepts are shown. The inventive concepts and methods of achieving them will be apparent from the following exemplary embodiments that will be described in more detail with reference to the accompanying drawings. The embodiments of the inventive concepts may, however, be embodied in different forms and should not be constructed as limited to the embodiments set forth herein. Rather, these embodiments are provided so that this disclosure will be thorough and complete, and will fully convey the scope of the inventive concepts to those skilled in the art.

As used herein, the singular terms "a," "an" and "the" are intended to include the plural forms as well, unless the context clearly indicates otherwise. It will be understood that when an element is referred to as being "connected" or "coupled" to another element, it may be directly connected or coupled to the other element or intervening elements may be present. As used herein, the term "and/or" includes any and all combinations of one or more of the associated listed items. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Similarly, it will be understood that when an element such as a layer, region or substrate is referred to as being "connected to" or "on" another element, it can be directly connected to or on the other element or intervening elements may be present. In contrast, the term "directly" means that there are no intervening elements. Additionally, embodiments that are described in the detailed description may be described with sectional views as ideal exemplary views of the inventive concepts. Accordingly, shapes of the exemplary views may be modified according to manufacturing techniques and/or allowable errors. Therefore, the embodiments of the inventive concepts are not limited to the specific shape illustrated in the exemplary views, but may include other shapes that may be created according to manufacturing processes.

Embodiments of the present inventive concepts explained and illustrated herein may include their complementary counterparts. The same reference numerals or the same reference designators denote the same elements throughout the specification.

Figure 2:
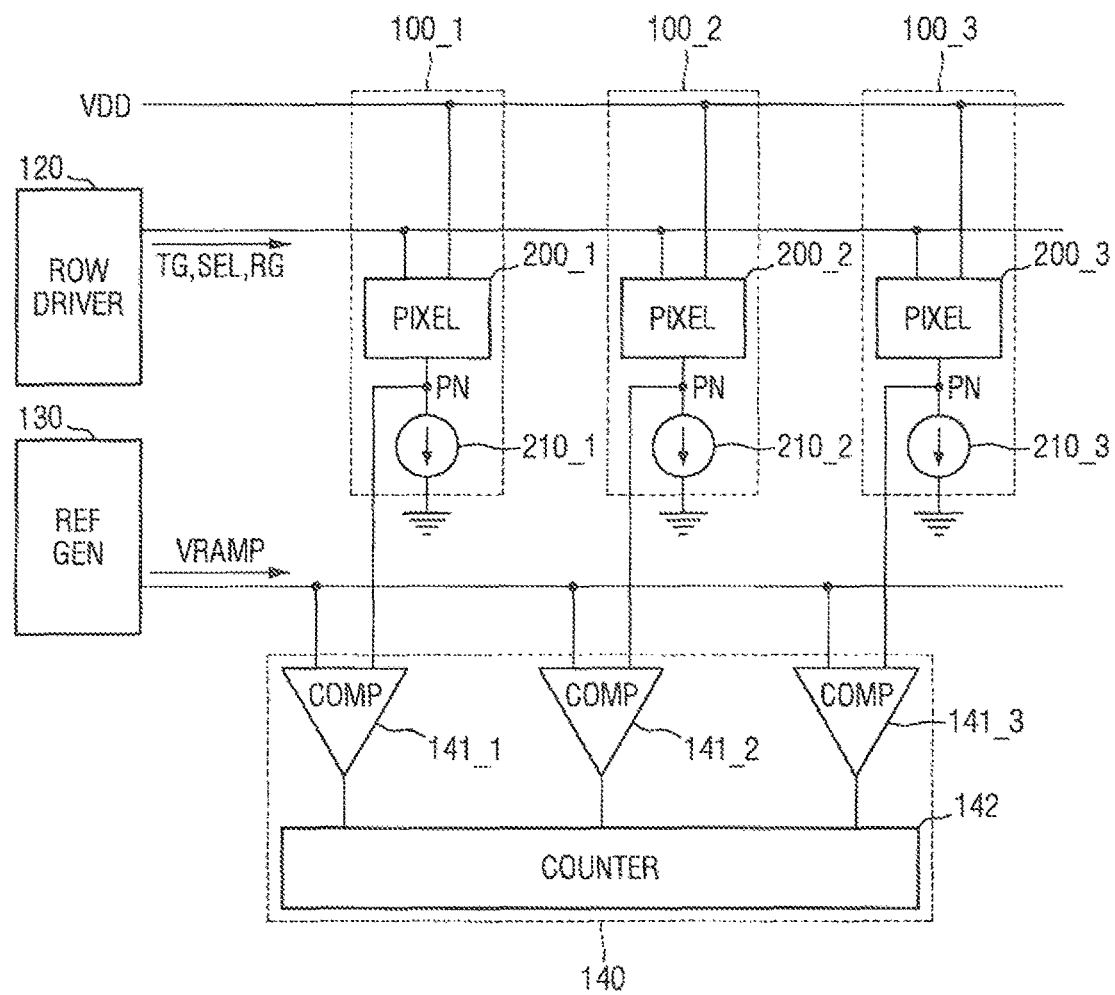
FIG. 2 is a circuit block diagram illustrating the pixel array, reference generator, and ADC of FIG. 1.

FIG. 1 is a block diagram illustrating an image sensor according to some embodiments of the inventive concepts, and FIG. 2 is a circuit block diagram illustrating the pixel array, reference generator, and ADC of FIG. 1.

Referring to FIGS. 1 and 2, an image sensor 10 according to some embodiments of the inventive concepts includes a pixel array 100, a timing control circuit 110, a row driver 120, a reference voltage generator 130, an analog-digital converter 140, and a column driver 150.

The pixel array 100 may include pixel circuits 100_1 to 100_3. For the convenience of explanation, the pixel array 100, as shown in FIG. 2, includes first to third of pixel circuits 100_1 to 100_3, but the inventive concepts are not limited thereto. In the pixel array, a plurality of pixel circuits may be arranged in the form of a matrix.

When a plurality of pixel circuits are arranged in the form of a matrix in the form of a matrix, the pixel array may include a plurality of rows and a plurality of column. A row selection line may be disposed for each row, and a column selection line may be disposed for each column. For example, when the pixel array 100 includes M×N pixels (each of M and N is an integer of 2 or more), M row selection lines and N column selection lines may be arranged in the pixel array 100.

The row addresses and row scans of the pixel array 100 may be controlled by the row driver 120 through the row selection lines, and the column addresses and column scans of the pixel array 100 may be controlled by the column driver 150 through the column selection lines.

Meanwhile, when the image sensor 10 employs a Bayer pattern technology, the pixels in the active pixel array 100 may be arranged to receive red (R) light, green (G) light, and blue (B) light, respectively. In contrast to this, the pixels may also be arranged to receive magenta (Mg) light, yellow (Y) light, cyan (Cy) light, and/or white (W) light.

The pixel circuits 100_1 to 100_3 may include active pixels 200_1 to 200_3 and bias circuits 210_1 to 210_3, respectively. The active pixels 200_1 to 200_3 may detect optical signals, convert the optical signals into electrical signals, and then provide output voltages to the analog-digital converter 140 through respective pixel nodes PN.

The bias circuits 210_1 to 210_3 may be disposed between respective ones of the active pixels 200_1 to 200_3 and an earth terminal. Specifically, the bias circuits 210_1 to 210_3 may be disposed between the respective ones of the pixel nodes PN, to which the output of the respective ones of the active pixels 200_1 to 200_3 are provided, and the earth terminal.

The bias circuits 210_1 to 210_3 that are connected with the active pixels 200_1 to 200_3 may generate respective electric currents for driving respective ones of the active pixels 200_1 to 200_3, and, as will be described later, may compensate for noises included in a power supply voltage VDD, that is, fluctuations of an output voltage outputted through the pixel nodes of the active pixels 200_1 to 200_3 due to a ripple voltage.

The reference signal generator 130 may generate a reference signal VRAMP and may provide the generated reference signal VRAMP to the analog-digital converter 140. The reference signal VRAMP may be a voltage signal that increases or decreases in the form of a ramp.

The analog-digital converter 140 may generate a digital signal by performing analog to digital conversion of the outputs of the pixel array 100 using the reference signal VRAMP. The analog-digital converter 140, for example, may be a single slope analog-digital converter, but embodiments of the inventive concepts are not limited thereto.

The analog-digital converter 140 may be controlled by the timing control circuit 110. The operation of the analog-digital converter 140 may be performed in the same cycle as the operation of the row driver 120 to drive a row selection circuit of the pixel array 100.

The analog-digital converter 140 may include a plurality of comparators 141_1 to 141_3 respectively connected to the pixel circuits 100_1 to 100_3, and may include a counter 142.

The comparators 141_1 to 141_3 may receive the reference signal VRAMP from the reference signal generator 130, may compare this reference signal VRAMP with the voltage signal outputted from the pixel circuits 100_1 to 100_3 through the respective pixel nodes PN, and may output the result thereof. The counter 142 may generate digital signals using the results outputted from the comparators 141_1 to 141_3.

The row driver 120 may receive control signals from the timing control circuit 110 and control the row addresses and row scans of the pixel array 100. For example to select a row selection line to activate, the row driver 120 may apply an activation signal of the corresponding row selection line to the pixel array 100.

The control signals provided to the pixel array 100 by the low driver, for example, may include a low selection signal SEL, a reset control signal RG, and a transmission control signal TG, but embodiments of the inventive concepts are not limited thereto.

The column driver 150 may receive control signals from the timing control circuit 110 and control the column addresses and column scans of the pixel array 100. In this case, the column driver 150 may output a digital output signal outputted from the analog-digital converter 140 to a digital signal processor (DSP), an image signal processor (ISP), or an external host.

Figure 3A:
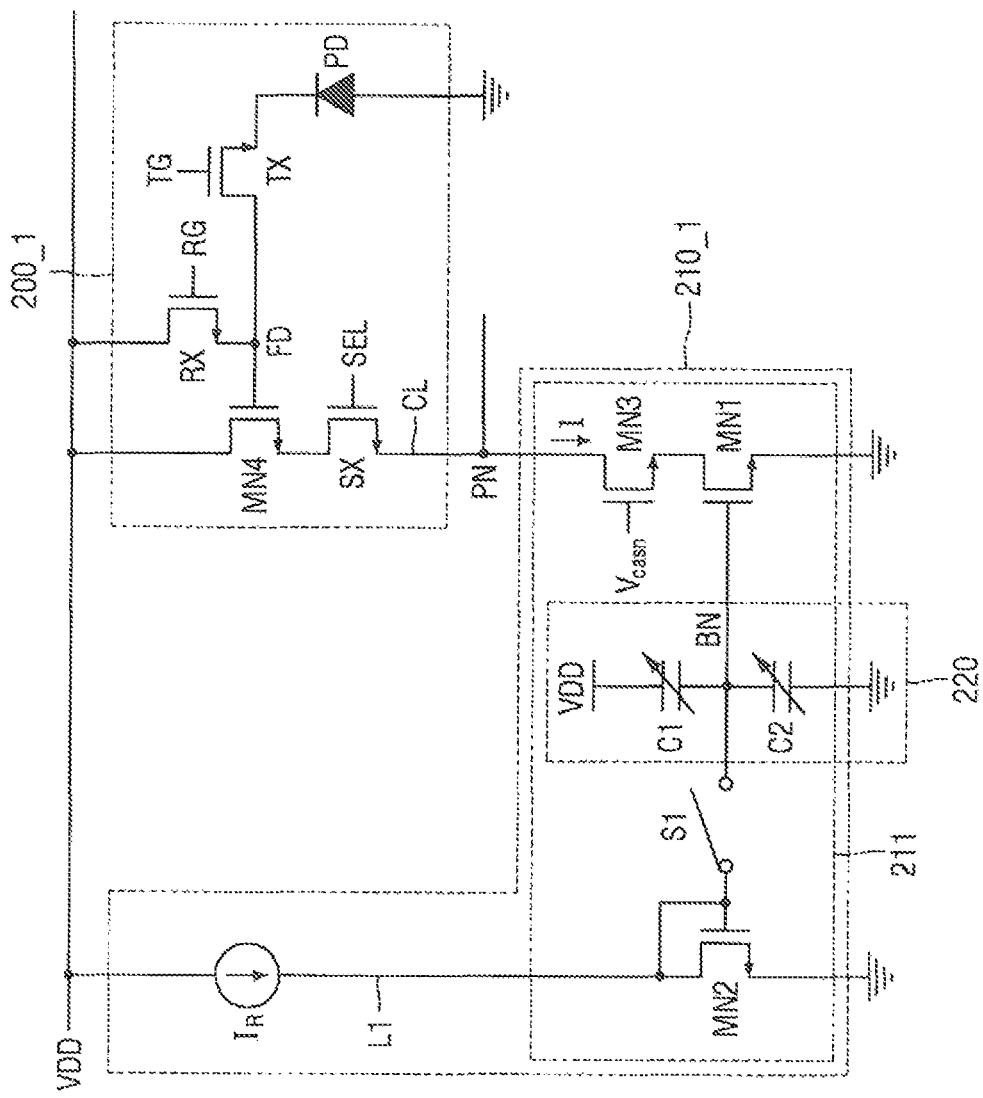
FIG. 3A is a circuit block diagram illustrating an active pixel and pixel bias circuit of FIG. 2 according to some embodiments of the inventive concepts.

FIG. 3A is a circuit block diagram illustrating an active pixel and pixel bias circuit of FIG. 2 according to some embodiments of the inventive concepts.

Referring to FIG. 3A, the active pixel 200_1 may include a photodiode PD, a transmission transistor TX, a reset transistor RX, a drive transistor MN4, and a selection transistor SX, and may output an output voltage to the pixel node PN connected through a column line CL.

The photodiode PD may absorb externally applied optical signals and may accumulate electric charge corresponding to an amount of light. The photodiode PD may be coupled with the transmission transistor TX that may transmit the accumulated electric charge to a floating diffusion node FD. The transmission transistor TX may transmit the electric charge, which may be generated by the photodiode PD using the transmission control signal TG provided from the row driver (120 of FIG. 1), to the floating diffusion node FD.

The floating diffusion node FD may have a parasitic capacitance, and may cumulatively store the electric charged provided from the transmission transistor TX to convert the stored electric charge into a voltage. The drive transistor MN4 may generate a source-drain current in proportion to the voltage level of the floating diffusion node FD. The drive transistor MN4 may have a configuration of a source follower amplifier.

The reset transistor RX may reset the floating diffusion node FD by the reset signal RG periodically provided from the row driver 120. When the reset transistor RX is turned on by the reset signal RG, the power supply voltage provided to a drain of the reset transistor RX may be transmitted to the floating diffusion node FD.

The selection transistor SX may transmit the current generated from the drive transistor MN4 by the row selection signal SEL provided from the row driver 120 to the pixel node PN through the column line.

The active pixel 200_1 shown in FIG. 3A is configured to include the photodiode PD and the four transistors of the transmission transistor TX, the reset transistor RX, the drive transistor MN4, and the selection transistor 4, but embodiments of the inventive concepts are not limited thereto. Hereinafter, active pixels having other configurations will be described with reference to FIGS. 4A and 4B.

Figure 4A:
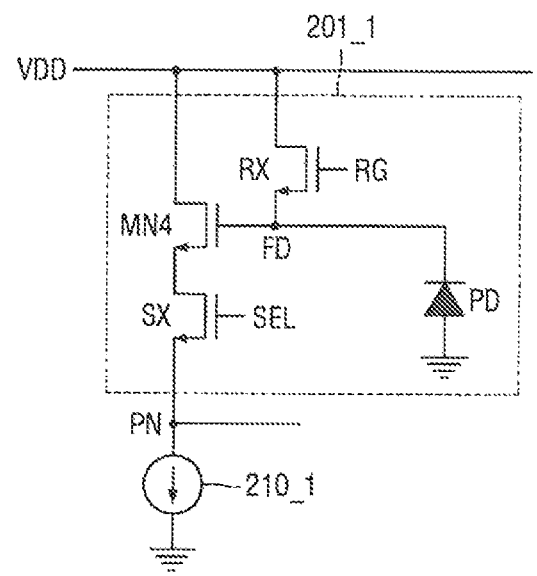
FIGS. 4A and 4B are circuit block diagrams illustrating active pixels that can be included in image sensors according to some embodiments of the inventive concepts.
Figure 4B:
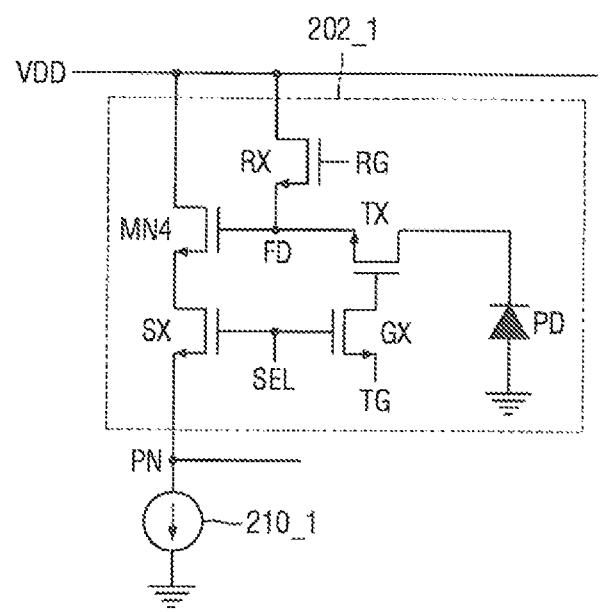

FIGS. 4A and 4B are circuit block diagrams illustrating active pixels that can be included in image sensors according to some embodiments of the inventive concepts.

Referring to FIG. 4A, an active pixel 201_1, differently from the aforementioned active pixel (200_1 of FIG. 3A), may be a 3T structure including a photodiode PD and three transistors of a reset transistor RX, a drive transistor MN4, and a selection transistor SX.

The electric charge generated from the photodiode PD may be directly charged in the floating diffusion node FD, and the drive transistor MN4 may generate a source-drain electric current in proportion to the voltage level of the floating diffusion node FD.

Referring to FIG. 4B, an active pixel 202_1 may be a 5T structure further including one transistor GX in addition to the photodiode PD, the transmission transistor TX, the reset transistor RX, the drive transistor MN4, and the selection transistor SX. As such, the structure of the active pixel included in the pixel array (100 of FIG. 1) may be a 3T, 4T, or 5T structure. In some embodiments, the active pixel may have structures other than those described above.

Referring to FIG. 3A again, the bias circuit 210_1 may include a first current mirror 211, and the first current mirror 211 may include first to third transistors MN1 to MN3, a switch S1, and a variable capacitor 220.

As shown in FIG. 3A, the first current mirror 211 may include a first transistor MN1 and a second transistor MN2, and may be a current mirror into which a first current I and a second current $I_R$ flow. The first current mirror 211 may receive the second current $I_R$ through a first line L1. The second current $I_R$ may be copied by the first current mirror 211 to appear as the first current I flowing into the first transistor MN1.

The gate of the first transistor MN1 and the gate of the second transistor MN2 may be connected with each other through a first bias node BN. The first capacitor C1 and the second capacitor C2 may be respectively connected to the first bias node BN. One end of the first capacitor C1 may be connected with the power supply voltage VDD, and the other end thereof may be connected with the first bias node BN. One end of the second capacitor C2 may be connected with the earth voltage, and the other end thereof may be connected with the first bias node BN. In some embodiments, the first capacitor C1 and the second capacitor C2 may be variable capacitors that can adjust capacitance.

The switch S1 may be connected between the second transistor MN2 and the first bias node BN. When the switch S1 is turned on, the first bias node BN may be connected with the second transistor MN2, and the first capacitor C1 and the second capacitor C2 may be charged with an electric charge. When the switch S1 is turned off, the first bias node BN may be disconnected with the second transistor MN2, and the voltage charged in the first capacitor C1 and the second capacitor C2 may be maintained.

Generally, when the level of the power supply voltage VDD supplying power to the active pixel 200_1 is fluctuated by noises, the level of the output voltage of the pixel node PN, outputted from the active pixel 200_1, may also be fluctuated by the influence of the power supply voltage VDD. In this case, since all of the active pixels connected to one row selection line are simultaneously influenced by the fluctuation of the power supply voltage VDD, the image obtained by the image sensor may have row line noises.

In the image sensor according to some embodiments of the inventive concepts, the fluctuation of the level of the power supply voltage VDD may be compensated by the first capacitor C1 and the second capacitor C2, which are included in the bias circuit 210_1 or the current mirror 211 and the respective one ends of which are connected to the power supply voltage VDD and the earth voltage, and the compensated power supply voltage may be outputted to the pixel node PN.

With respect to the controlling of the capacitances of the first capacitor C1 and the second capacitor C2 by the variable capacitor 220, it will be described in more detail with reference to FIGS. 3B and 3C.

Figure 3B:
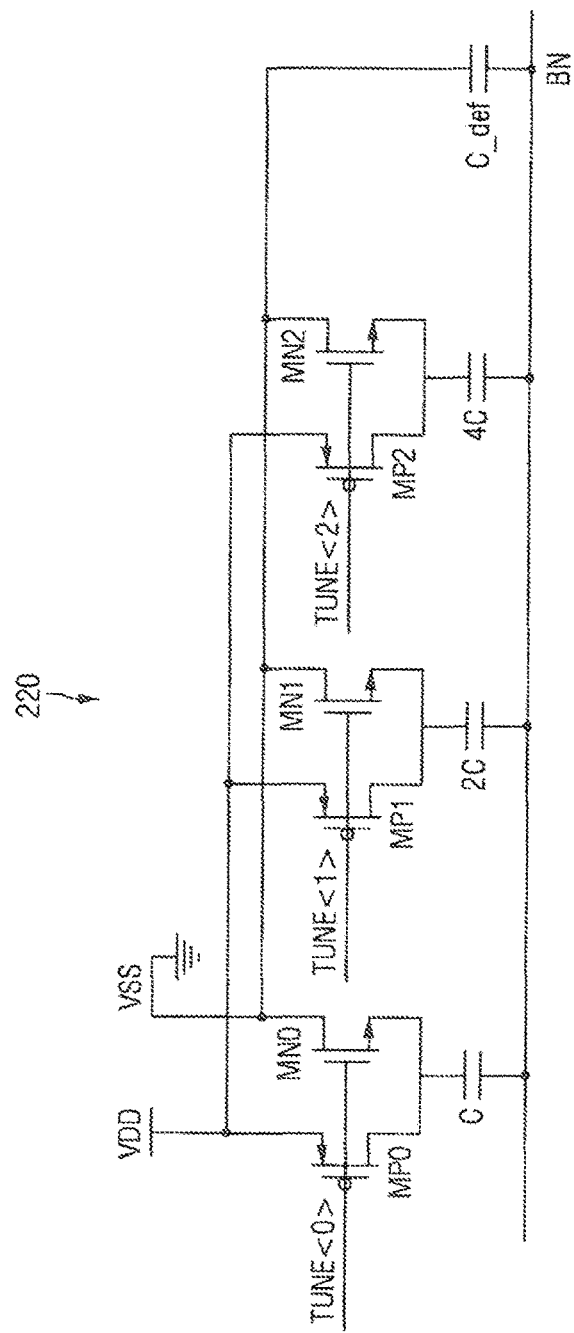
FIG. 3B is an exemplary circuit block diagram illustrating a variable capacitor of FIG. 3A according to some embodiments of the inventive concepts.

FIG. 3B is an exemplary circuit block diagram illustrating a variable capacitor of FIG. 3A according to some embodiments of the inventive concepts and FIG. 3C is a diagram illustrating operation of the variable capacitor of FIG. 3B according to some embodiments of the inventive concepts.

Referring to FIGS. 3B and 3C, in some embodiments of the present inventive concept, the variable capacitor 220 may include a plurality of capacitors having different capacitances and transistors MN0, MN1, MN2, MP0, MP1, and MP2 coupled to the capacitors, respectively.

The plurality of capacitors may include, for example, capacitors having capacitances that increase by a factor of two. In FIG. 3B, the capacitor having the smallest capacitance is denoted by C, the capacitor having the capacitance two times of the capacitance of C is denoted by 2C, and the capacitor having the capacitance of two times the capacitance of 2C is denoted by 4C.

The transistors MN0, MN1, MN2, MP0, MP1, and MP2 may connect the plurality of capacitors to the power supply voltage VDD or the ground voltage VSS by the control signal TUNE. The control signal TUNE may be a signal including the same number of bits as the number of the plurality of the capacitors. As shown in FIG. 3B, the control signal TUNE for controlling the three capacitors may be composed of 3 bits.

As shown in FIG. 3C, the capacitance ratio C1/C1+C2 of the variable capacitor 220 may be determined depending on whether each bit of the control signal TUNE <0>, TUNE <1>, TUNE <2> is turned on or off. For example, when the respective bits of the control signal TUNE <0>, TUNE <1>, TUNE <2> are all '0', the ratio of the capacitance of the variable capacitor 220 is 1. Alternatively, when the respective bits of the control signal TUNE <0>, TUNE <1>, TUNE <2> are '1', '0', '1', the ratio of the capacitances of the variable capacitor 220 2/7. The ratio of the capacitance of the variable capacitor 220 may be used to calculate the compensated voltage VPIX2 generated by the bias circuit 210_1 described below with reference to FIG. 5.

Hereinafter, a method of compensating the power source noise of the image sensor according to some embodiments of the inventive concepts will be described with reference to FIG. 5.

FIG. 5 is a timing chart illustrating an operation of an image sensor according to some embodiments of the inventive concepts.

At first time T1, the variation ΔVDD of the power supply voltage VDD due to a ripple voltage may be generated. Because of the variation ΔVDD of the power supply voltage VDD due to the ripple voltage, at second time T2, the voltage VFD of the floating diffusion node coupled with the power supply voltage VDD may also be varied. Here, the variation of the voltage of the pixel node PN due to the variation of the voltage VFD of the floating diffusion node is represented by ΔVPIX1. The variation of the voltage VFD of the floating diffusion node due to the variation ΔVDD of the power supply voltage VDD, and the variation of the voltage VPIX1 of the pixel node due to the variation of the voltage VFD of the floating diffusion node may be determined depending on the parasite capacitances among the floating diffusion node FD, the power supply voltage VDD, and the earth voltage.

All of the variations of the power supply voltage VDD due to the ripple voltage, the floating diffusion node voltage VFD, and pixel node voltage VIPX1 due to the floating diffusion node voltage VFD may have similar phases to each other.

Meanwhile, due to the first capacitor C1 coupled with the power supply voltage VDD and the second capacitor C2 coupled with the earth voltage, the voltage VBN of the first bias node may also be varied in the same phase as the power supply voltage VDD. That is, due to the increase of the power supply voltage VDD, the voltage VBN of the first bias node may increase.

With the increase in the voltage VBN of the first bias node, the voltage between the gate and source of the first transistor MN1 may increase, and thus the first current I may increase.

Meanwhile, if the output voltage generated by the varied first current I is represented by VPIX2, the phase of the output voltage VPIX2 may be opposite to the phase of variation of the first current I. The reason for this is that the drive transistor MN4 included in the pixel circuit 200_1 is configured to have a bias circuit 210_1 and a source follower amplifier which are connected with each other through a load. That is, the voltage of the pixel node PN, which is an output voltage of the source follower amplifier, may be varied to be opposite to the phase of the first current I, which is a current of the source follower amplifier.

Consequently, the variation of the compensated voltage VPIX2 generated by the bias circuit 210_1 may be calculated by the following Equation 1.

$$\Delta Vdd \times \frac{C1}{C1+C2} \times \frac{gmp2}{gmn2} \times \frac{gmn1}{gmn4} \cong \Delta Vpix2$$

Here, C1 and C2 are capacitances of the first capacitor C1 and the second capacitor C2, respectively, gmn1 is a transconductance of the first transistor MN1, and gmn4 is a transconductance of the drive transistor MN4.

In some embodiments of the present inventive concept, C1/C1+C2 in Equation 1 may be calculated using the ratio of the capacitance of the variable capacitor 220 described with reference to FIGS. 3B and 3C.

As described above, the variation of the output voltage VPIX1 of the pixel node PN due to the variation of the power supply voltage VDD may be equal to the variation of the compensated voltage VPIX2 generated by the bias circuit 210_1. Therefore, the variation of the compensated voltage VPIX2 generated by the bias circuit 210_1 may be adjusted by adjusting the capacitance C1 of the first capacitor and the capacitance C2 of the second capacitor.

Figure 6:
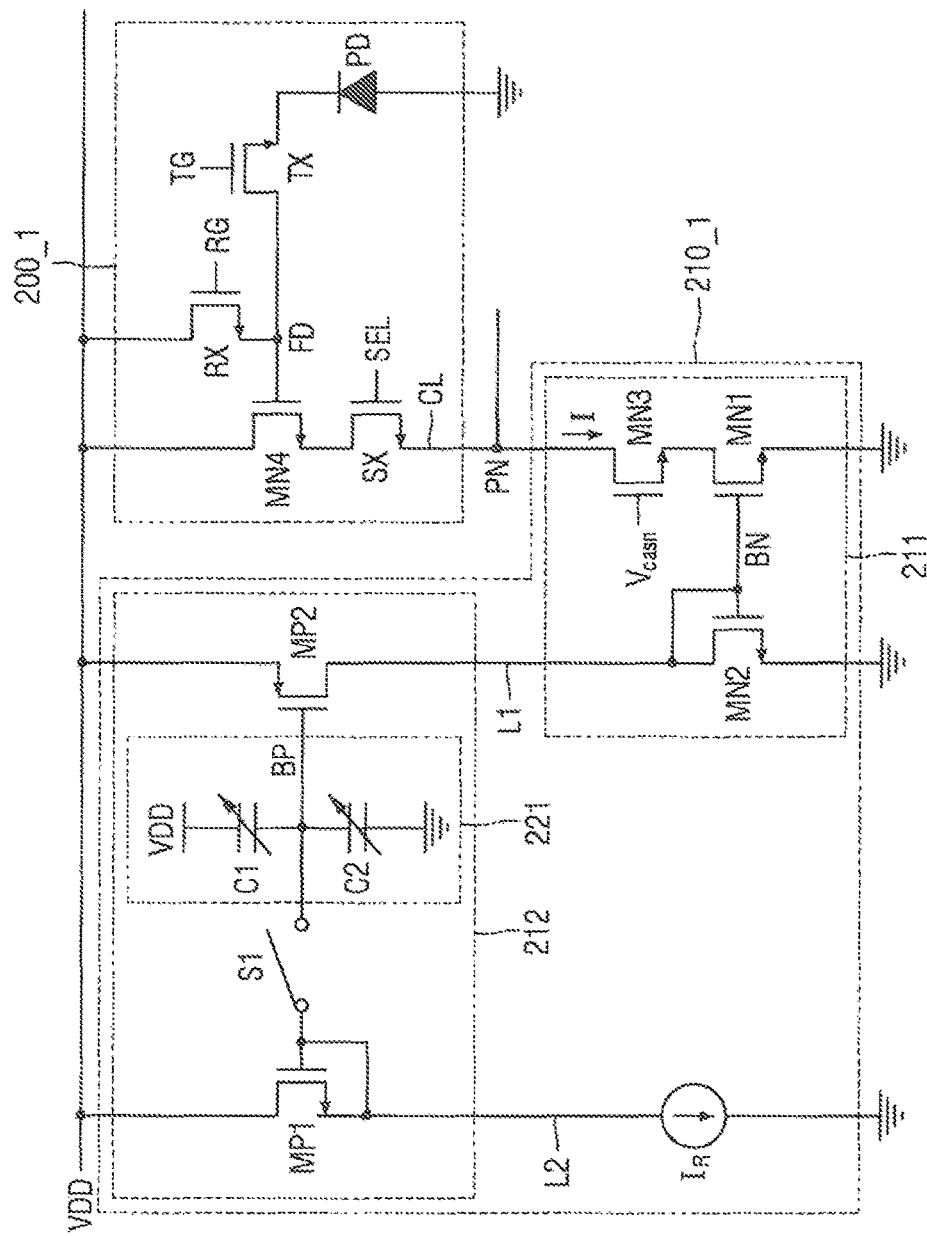
FIG. 6 is a circuit block diagram illustrating an image sensor according to some embodiments of the inventive concepts.

FIG. 6 is a circuit block diagram illustrating an image sensor according to some embodiments of the inventive concepts. In this embodiment, description of points overlapping those of the aforementioned embodiment will be omitted, and differences therefrom will be described.

Referring to FIG. 6, the image sensor according to some embodiments of the inventive concepts may further include a second current mirror 212.

The second current mirror 212 may include a fourth transistor MP2 and a fifth transistor MP1, and may include a variable capacitor 221 which are connected with the respective transistors MP1 and MP2 through a second bias node BP.

The fourth transistor MP2 may be connected with the second transistor MN2, and may provide an output current to the first current mirror 211 depending on the ratio of the first capacitor C1 and the second capacitor C2.

The fifth transistor MP1 may be connected with the fourth transistor MP2 through the second bias node BP when the switch S1 is turned on.

The first capacitor C1 and the second capacitor C2 may be respectively connected to the second bias node BP. One end of the first capacitor C1 may be connected with the power supply voltage VDD, and the other end thereof may be connected with the second bias node BP. One end of the second capacitor C2 may be connected with the earth voltage, and the other end thereof may be connected with the second bias node BP.

The variable capacitor 221 may control the ratio of the capacitances of the capacitors C1 and C2 in the same manner as the variable capacitor 220 in FIG. 3A, but the present inventive concept is not limited thereto.

When the switch S1 of the second current mirror 212 is turned on, the second bias node BP may be connected with the fifth transistor MP1, and the first capacitor C1 and the second capacitor C2 may be charged with an electric charge. When the switch S1 is turned off, the second bias node BP may be disconnected with the fifth transistor MP1, and the voltage charged in the first capacitor C1 and the second capacitor C2 may be maintained.

Figure 7:
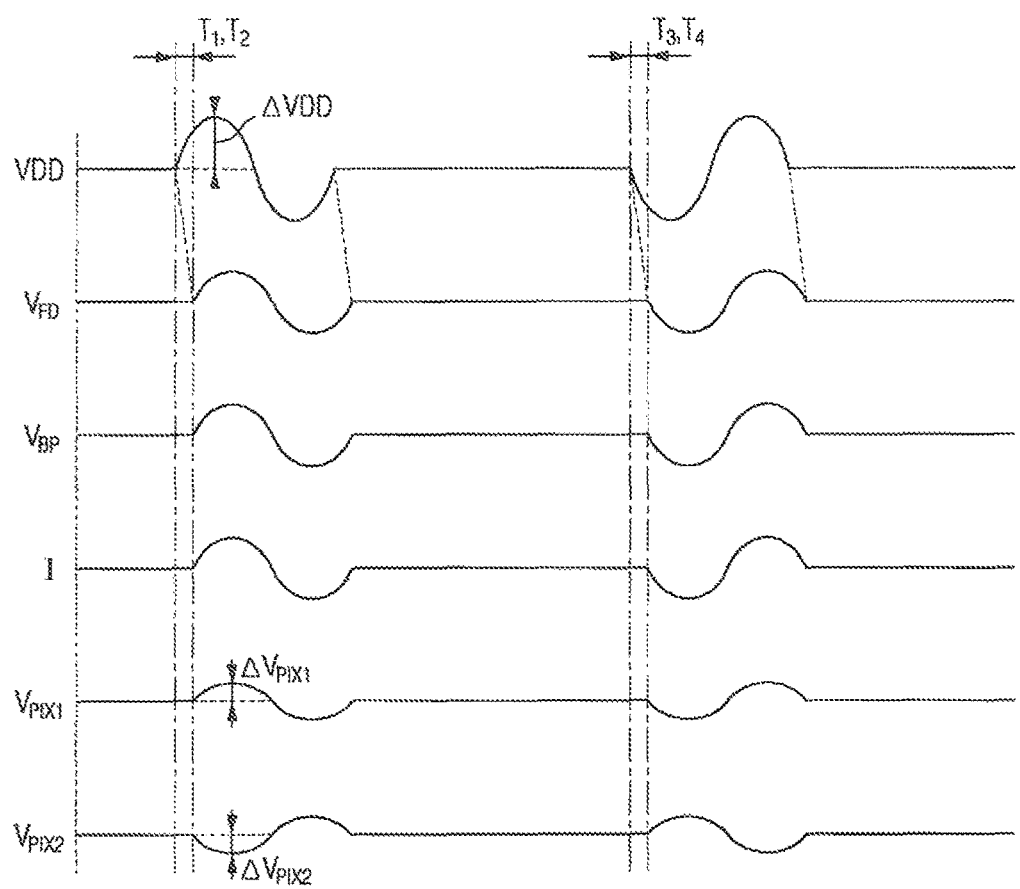
FIG. 7 is a timing chart illustrating an operation of the image sensor of FIG. 6 according to some embodiments of the inventive concepts.

FIG. 7 is a timing chart illustrating an operation of the image sensor of FIG. 6 according to some embodiments of the inventive concepts.

Referring to FIG. 7, at first time T1, the variation of the voltage of the pixel node PN is represented by ΔVPIX1 according to the variation ΔVDD of the power supply voltage VDD due to a ripple voltage and the variation of the voltage VFD of the floating diffusion node.

Meanwhile, due to the first capacitor C1 coupled with the power supply voltage VDD and the second capacitor C2 coupled with the earth voltage, the voltage VBP of the second bias node may also be varied in the similar phase the power supply voltage VDD. The level of the current provided from the second current mirror 212 to the first current mirror 211 may be varied according to the variation of the voltage VBP of the second bias node, and the variation in the level of the current may be copied by the first current mirror 211 to appear as the variation in the level of the first current I. Due to the variation in the level of the first current I, similarly to the aforementioned embodiment, the compensated voltage VPIX2 generated by the bias circuit 210_1 may be varied to have a phase opposite to that of the first current I.

Consequently, the variation of the compensated voltage VPIX2 generated by the bias circuit 210_1 may be calculated by the following Equation 2.

$$\Delta Vdd \times \frac{C2}{C1+C2} \times \frac{gmp2}{gmn2} \times \frac{gmn1}{gmn4} \cong \Delta Vpix2$$

Here, gmn2 is a transconductance of the second transistor MN2, and gmp2 is a transconductance of the fourth transistor MP2.

Figure 8:
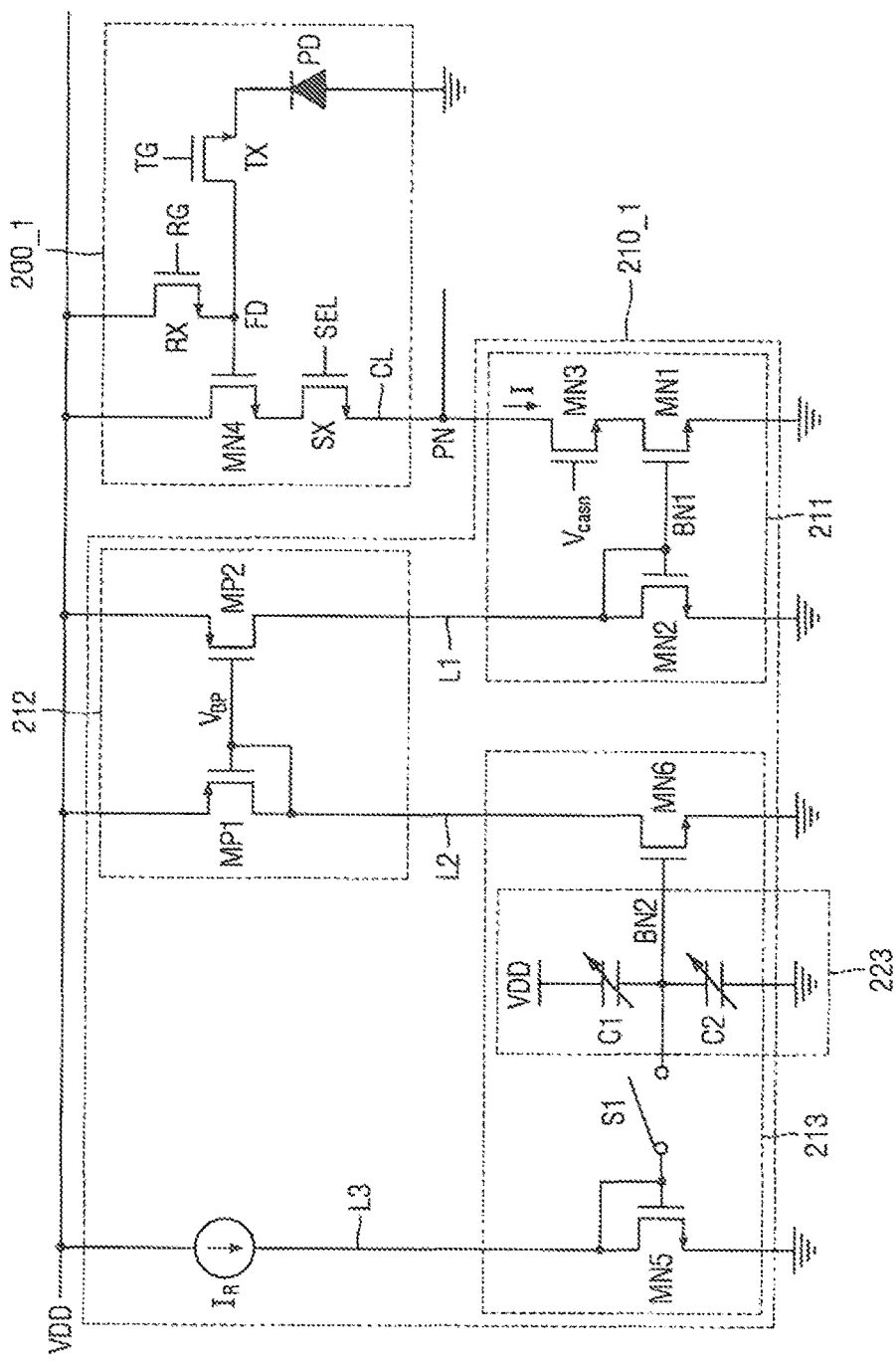
FIG. 8 is a circuit block diagram illustrating an image sensor according to some embodiments of the inventive concepts.

FIG. 8 is a circuit block diagram illustrating an image sensor according to some embodiments of the inventive concepts.

Referring to FIG. 8, the image sensor according to still another embodiment of the inventive concepts may further include a third current mirror 213.

The third current mirror 213 may include a sixth transistor MN6 and a seventh transistor MN5, and may include a variable capacitor 223 which may be connected with the respective transistors MN5 and MN6 through a third bias node BN2.

The sixth transistor MN6 may be connected with the fifth transistor MP1, and may mirror the second current $I_R$ to allow the second current $I_R$ to flow through a second line L2. The seventh transistor MN5 may be connected with the sixth transistor MN6 through the third bias node BN2 when the switch S1 is turned on.

The first capacitor C1 and the second capacitor C2 may be respectively connected to the third bias node BN2. One end of the first capacitor C1 may be connected with the power supply voltage VDD, and the other end thereof may be connected with the third bias node BN2. One end of the second capacitor C2 may be connected with the earth voltage, and the other end thereof may be connected with the third bias node BN2.

The variable capacitor 223 may control the ratio of the capacitances of the capacitors C1 and C2 in the same manner as the variable capacitor 220 in FIG. 3A, but the present inventive concept is not limited thereto.

Figure 9:
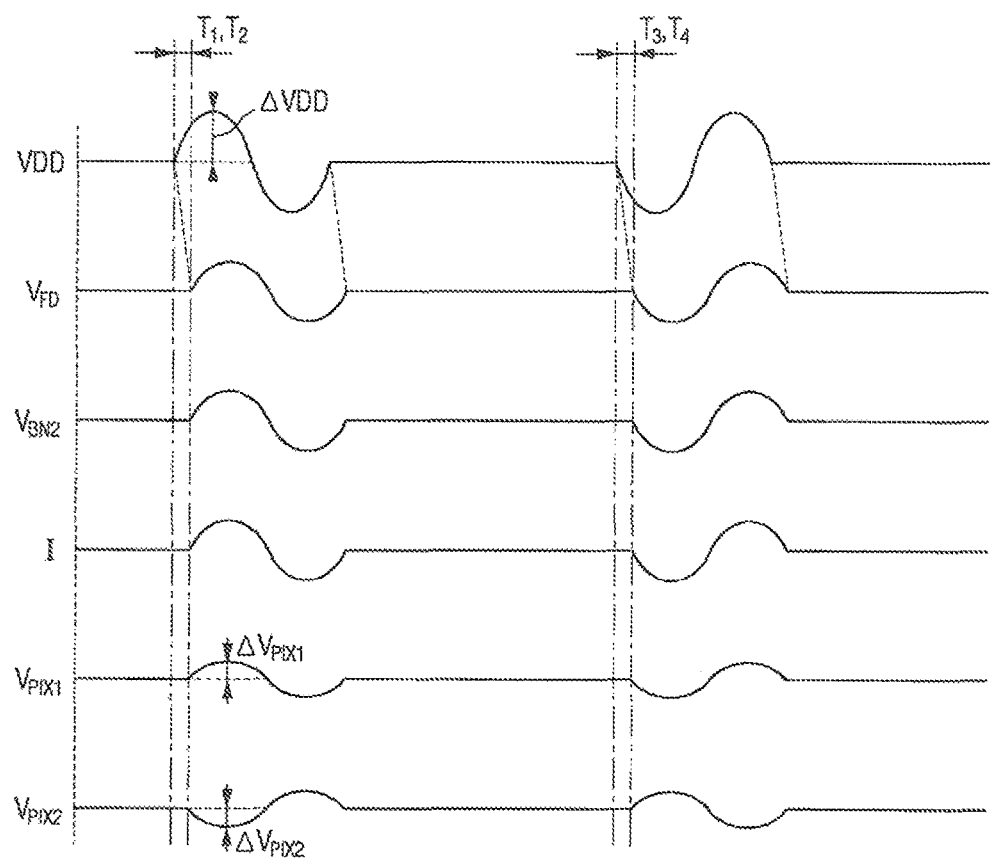
FIG. 9 is a timing chart illustrating an operation of the image sensor of FIG. 8 according to some embodiments of the inventive concepts.

FIG. 9 is a timing chart illustrating an operation of the image sensor of FIG. 8 according to some embodiments of the inventive concepts.

Referring to FIG. 9, at first time T1, the variation of the voltage of the pixel node PN is represented by ΔVPIX1 according to the variation ΔVDD of the power supply voltage VDD due to a ripple voltage and the variation of the voltage VFD of the floating diffusion node.

Meanwhile, due to the first capacitor C1 coupled with the power supply voltage VDD and the second capacitor C2 coupled with the earth voltage, the voltage VBN2 of the third bias node may also be varied in the similar phase the power supply voltage VDD. The level of the current provided from the third current mirror 213 to the second current mirror 212 may be varied according to the variation of the voltage VBN2 of the third bias node, and the variation in the level of the current may be copied by the second current mirror 212 and the first current mirror 211 to appear as the variation in the level of the first current I. Due to the variation in the level of the first current I, similarly to the aforementioned embodiments, the compensated voltage VPIX2 generated by the bias circuit 210_1 may be varied to have a phase opposite to that of the first current I.

Consequently, the variation of the compensated voltage VPIX2 generated by the bias circuit 210_1 may be calculated by the following Equation 3.

$$\Delta Vdd \times \frac{C1}{C1+C2} \times \frac{gmn6}{gmp1} \times \frac{gmp2}{gmn2} \times \frac{gmn1}{gmn4} \cong \Delta Vpix2$$

Here, gmn6 is a transconductance of the sixth transistor MN6, and gmp1 is a transconductance of the fifth transistor MP1.

Figure 10A:
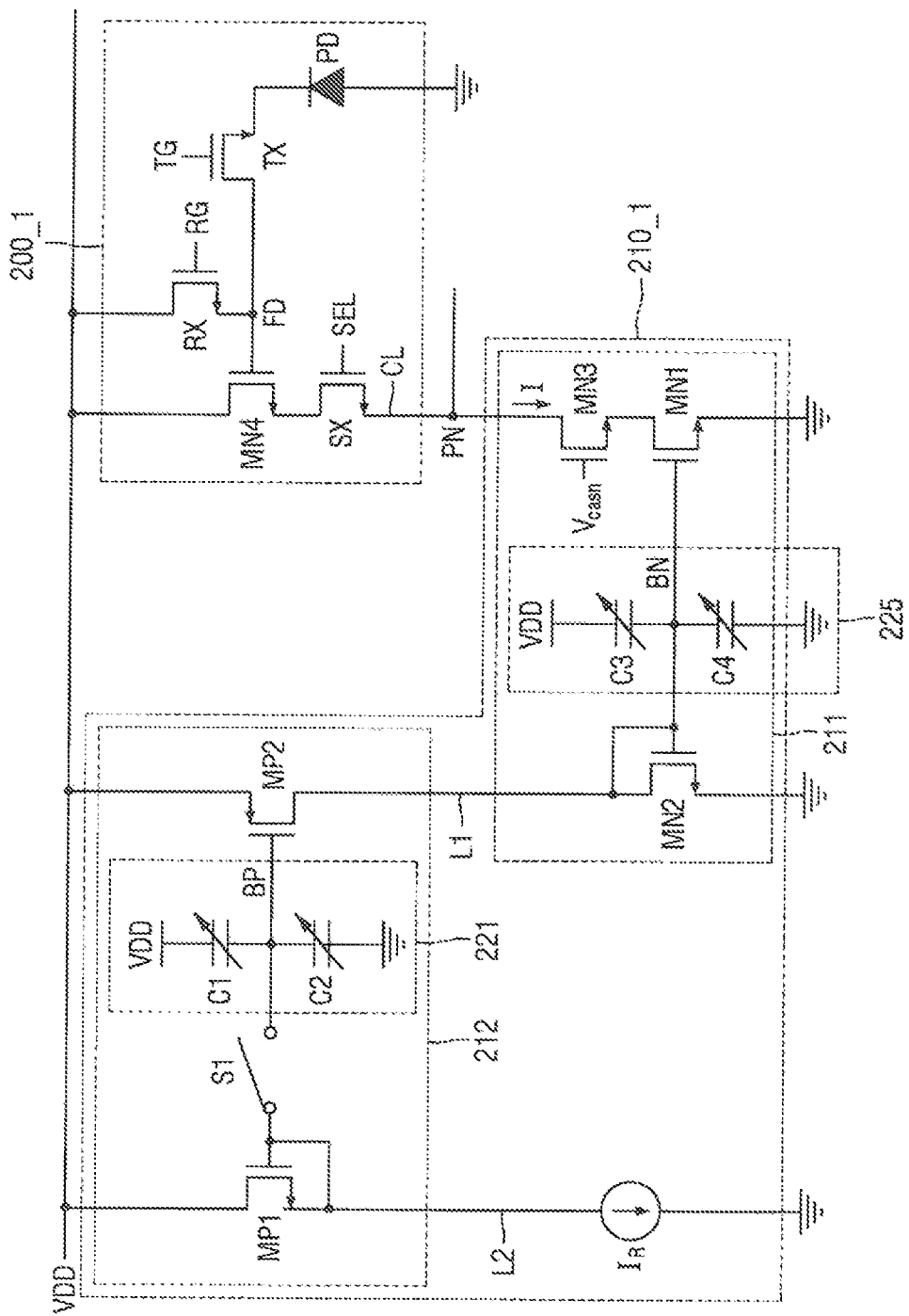
FIG. 10A is a circuit block diagram illustrating an image sensor according to some embodiments of the inventive concepts.

FIG. 10A is a circuit block diagram illustrating an image sensor according to some embodiments of the inventive concepts.

The image sensor according to some embodiments of the inventive concepts may be similar to the image sensor described above with reference to FIG. 6, but may further include a variable capacitor 225 in the first current mirror 211.

The third capacitor C3 and the fourth capacitor C4 may be respectively connected to the first bias node BN. One end of the third capacitor C3 may be connected with the power supply voltage VDD, and the other end thereof may be connected with the first bias node BN. One end of the fourth capacitor C4 may be connected with the earth voltage, and the other end thereof may be connected with the first bias node BN. The third capacitor C3 and the fourth capacitor C4 may be variable capacitors that can adjust capacitance.

Similarly to the operation of the image sensor having been described with reference to FIG. 6, the variation in the voltage VBP of the second bias node due to the variation of the power supply voltage VDD may be adjusted depending on the ratio of the first capacitor C1 and the second capacitor C2.

Meanwhile, the phase of the voltage VBN of the first bias node BN may be varied by the third capacitor C3 and fourth capacitor C4 connected to the first bias node BN of the first current mirror 211.

That is, the phase of the variation in the voltage VBN of the first bias node BN may be accelerated or delayed depending on the ratio of the third capacitor C3 and the fourth capacitor C4. Therefore, the phase of the first current I provided to the first current mirror 211 may also be accelerated or delayed, similarly to the phase of the variation in the voltage VBN of the first bias node BN.

Consequently, the phase of the compensated voltage VPIX2 generated by the bias circuit 210_1, generated by the first current I, may be varied depending on the ratio of the third capacitor C3 and the fourth capacitor C4, and thus the noises included in the power supply voltage VDD can be effectively compensated.

With respect to the controlling of the capacitances of the third capacitor C3 and the fourth capacitor C4 by the variable capacitor 225, it will be described in more detail with reference to FIGS. 10B and 10C.

Figure 10B:
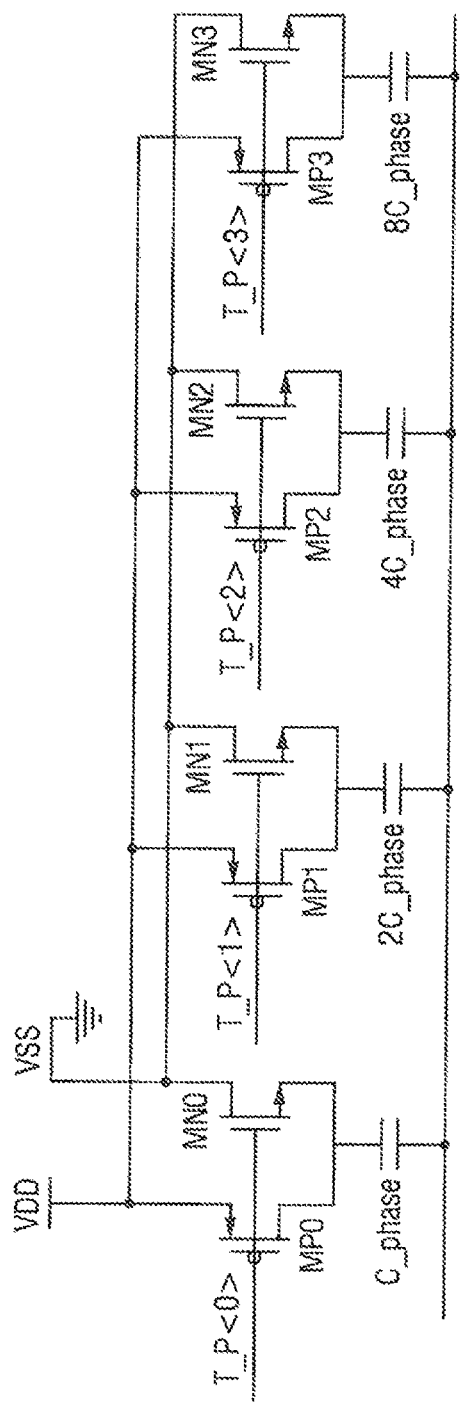
FIG. 10B is an exemplary circuit block diagram illustrating a variable capacitor of FIG. 10A according to some embodiments of the inventive concepts.

FIG. 10B is an exemplary circuit block diagram illustrating a variable capacitor of FIG. 10A according to some embodiments of the inventive concepts and FIG. 10C is a diagram illustrating operation of the variable capacitor of FIG. 10B according to some embodiments of the inventive concepts.

Referring to FIGS. 10B and 10C, in some embodiments of the present inventive concept, the variable capacitor 225 may be configured similar to the variable capacitor described with reference to FIGS. 3B and 3C However, the number of capacitors and transistors used for controlling the ratio of the capacitance of the variable capacitor 225 may be different from that of the variable capacitor 220. More specifically, the variable capacitor 225 may include more transistors and capacitors connected thereto than the variable capacitor 220.

For example, the variable capacitor 225 may include transistors MN0, MN1, MN2, MN3, MP0, MP1, MP2 and MP3 by 4-bit control signal T_P. Each of the transistor MN0, MN, MN2, MN3, MP0, MP1, MP2 and MP3 is turn on or off by the control signal T_P to output the ratio C3/C3+C4 of the capacitance as shown in FIG. 10C.

The variable capacitor 225 may comprise more transistors and capacitors connected thereto for a finer phase control of the compensated voltage VPIX2.

Figure 11:
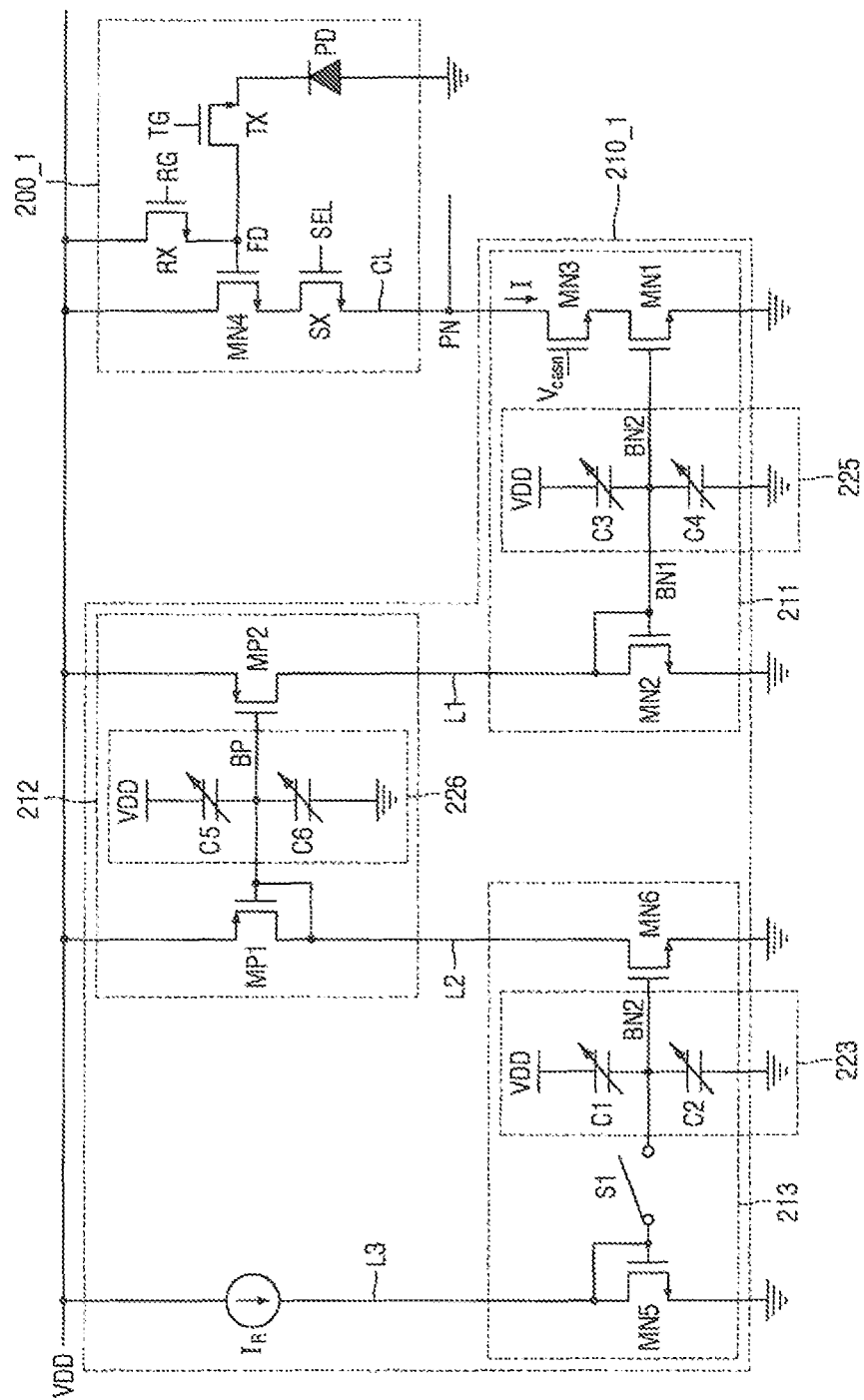
FIG. 11 is a circuit block diagram illustrating an image sensor according to some embodiments of the inventive concepts.

FIG. 11 is a circuit block diagram illustrating an image sensor according to some embodiments of the inventive concepts.

Referring to FIG. 11, the image sensor according to some embodiments of the inventive concepts is similar to the image sensor described above with reference to FIG. 8. However the image sensor may further include a variable capacitor 225 in the first current mirror 211 and a variable capacitor 226 in the second current mirror 212.

The variable capacitor 225 in the first current mirror 211 and the variable capacitor 226 in the second current mirror 212 may be configured in the same manner as the variable capacitor 225 described with reference to FIGS. 10B and 10C.

The magnitude of the compensated voltage VPIX2 generated by the bias circuit 210_1 may be controlled by using the variable capacitor 223, and the phase of the compensated voltage VPIX2 may be controlled by using the variable capacitors 225 and 226.

In some embodiments of the present inventive concept, the variable capacitor 226 may include more transistors and capacitors connected thereto than the variable capacitor 225. For example, if the variable capacitor 225 includes four pairs of the transistors controlled by a 4-bit control signal, the variable capacitor 226 may include five pairs of transistors controlled by a 5-bit control signal.

That is, the variable capacitor 225 may primarily adjust the phase of the compensated voltage VPIX2 generated by the bias circuit 210_1, and the variable capacitor 226 may more finely adjust the phase of the compensated voltage.

Figure 12:
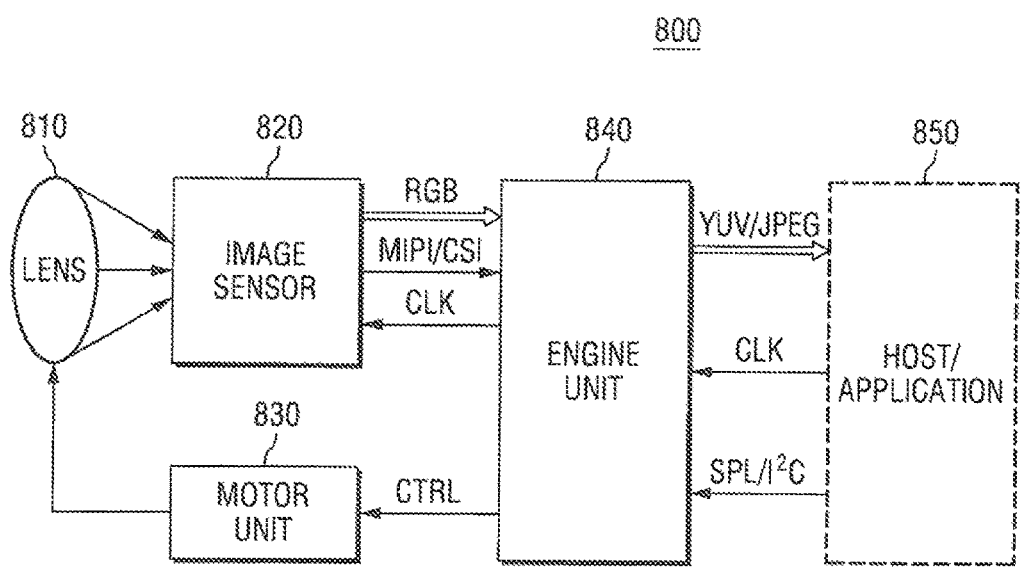
FIG. 12 is a block diagram of a digital camera including an image sensor according to some embodiments of the inventive concepts.

FIG. 12 is a block diagram of a digital camera including an image sensor according to some embodiments of the inventive concepts.

Referring to FIG. 12, a digital camera 800 may include a lens 810, an image sensor 820, a motor unit 830, and an engine unit 840. The image sensor 820 may include an image sensor that uses the aforementioned offset-compensated reference voltage as a reference voltage at the time of analog-digital conversion (ADC).

The lens 810 may condense incident light to the light-receiving region of the image sensor 820. The image sensor 820 may generate RGB data RGB of a Bayer pattern based on the incident light through the lens 810. The image sensor 820 may provide the RGB data RGB based on a clock signal CLK.

In some embodiments, the image sensor 820 may interface with the engine unit 840 through a mobile industry processor interface (MIPI) and/or a camera serial interface (CSI).

The motor unit 830 may adjust the focus of the lens 810 or shutter the lens 810 in response to a control signal CTRL received from the engine unit 840. The engine unit 840 may control the image sensor 820 and the motor unit 830. In addition, the engine unit 840 may generate YUV data YUV including a luminance component, a difference between the luminance component and a blue component, and a difference between the luminance component and a red component based on the RGB data RGB received from the image sensor 820, and/or may generate compressed data, for example, joint photography expert group (JPEG) data.

The engine unit 840 may be connected to a host/application 850, and may provide the YUV data and/or JPEG data to the host/application 850. The engine unit 840 may interface with the host/application 850 through a serial peripheral interface (SIP) and/or an inter integrated circuit (I2C).

Figure 13:
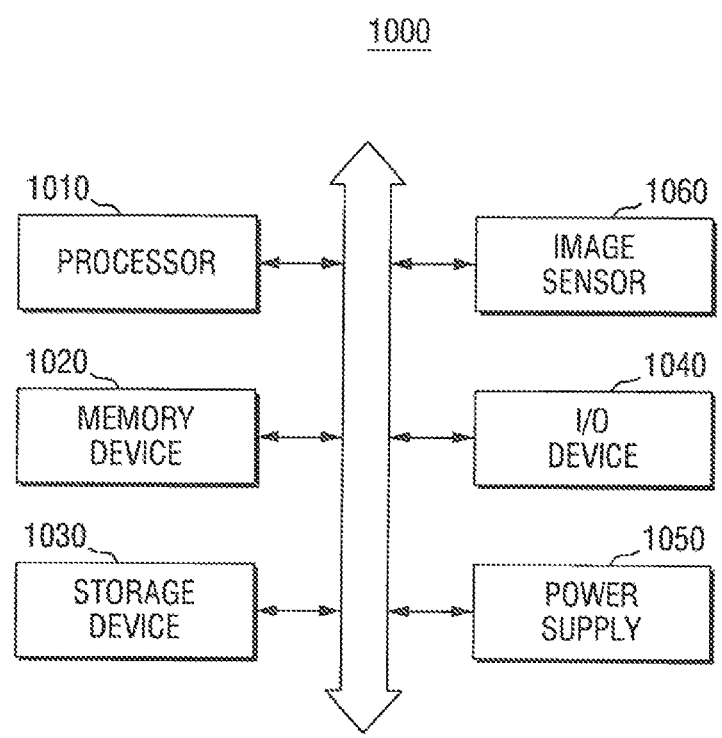
FIG. 13 is a block diagram of a computing system including an image sensor according to some embodiments of the inventive concepts.

FIG. 13 is a block diagram of a computing system including the image sensor according to some embodiments of the inventive concepts.

Referring to FIG. 13, a computing system 1000 may include a processor 1010, a memory device 1020, a storage device 1030, an input/output (I/O) device, a power supply 1050, and/or an image sensor 1060.

The image sensor 1060 may include an image sensor that uses the aforementioned offset-compensated reference voltage as a reference voltage at the time of analog-digital conversion (ADC). Meanwhile, although not shown in FIG. 12, the computing system 1000 may further include ports that can communicate with a video card, a sound card, a memory card, a USB device, and other electronic appliances.

The processor 1010 may perform specific calculations or tasks. In some embodiments, the processor 1010 may be a micro-processor or a central processing unit (CPU).

The processor 1010 may communicate with the memory device 1020, the storage device 1030, and/or the I/O device 1040 through an address bus, a control bus, and a data bus.

In some embodiments, the processor 1010 may be also connected to an expansion bus, such as a peripheral component interconnect (PCI) bus. The memory device 1020 may store the data required for the operation of the computing system 1000.

For example, the memory device 1020 may be embodied into DRAM, mobile DRAM, SRAM, PRAM, FRAM, MRAM and/or MRAM. The storage device may include a solid stage drive (SSD), a hard disk drive (HDD), CD-ROM, and the like.

The I/O device 1040 may include input means, such as a keyboard, a keypad, and a mouse, and/or output means, such as a printer and a display. The power supply 1050 may supply an operating voltage required for the operation of the computing system 1000.

The image sensor 1060 may be connected with the processor 1010 through buses or other communication links to perform communication. As described above, the image sensor 1060 may generate precise image data by compensating the offset of a reference voltage. The image sensor 1060 may be integrated into one chip together with the processor 1010, and the image sensor 1060 and the processor 1010 may also be respectively integrated into different chips.

Meanwhile, the computing system 1000 will be interpreted as any computing system using the image sensor. Examples of the computing system 1000 may include digital cameras, mobile phones, personal digital assistants (PDAs), portable multimedia players (PMPs), smart phones, and tablet PCs.

FIG. 14 is a block diagram illustrating an example of the interfaces used in the computing system of FIG. 13 according to some embodiments of the inventive concepts.

Referring to FIG. 14, the computing system 1100 may be embodied as a data processing apparatus that can use or support an MIPI interface, and may include an application processor 1110, an image sensor 1140, and/or a display 1150.

The CSI host 1112 of the application processor 1110 may perform a serial communication with the CSI device 1141 of the image sensor 1140 through a camera serial interface (CSI).

In some embodiments, the CSI host 1112 may include a deserializer DES, and the CSI device 1141 may include a serializer SER. The DSI host 1111 of the application processor 1110 may perform a serial communication with the DSI device 1151 of the display 1150 through a display serial interface (DSI). In some embodiments, the DSI host 1111 may include a serializer SER, and the DSI device 1151 may include a deserializer DES. The computing system 1100 may further include a radio frequency (RF) chip 1160 that can communicate with the application processor 1110. The PHY 1113 of the computing system 1100 and the PHY 1161 of the radio frequency (RF) chip 1160 may perform data transmission and receiving according to MIPI DigRF.

The application processor 1110 may further include a DigRF MASTER 1114 controlling the data transmission and receiving according to MIPI DigRF. Meanwhile, the computing system 1100 may include a global positioning system (GPS) 1120, a storage device 1170, a microphone MIC 1180, a dynamic radon access memory (DRAM) 1185, and a speaker 1190. Further, the computing system may perform a communication by using an ultra wide band (UWB) 1210, wireless local area network (WLAN) 1220, and a worldwide interoperability for microwave access (WIMAX) 1230. However, the structure and interface of the computing system 1100 are exemplary, and embodiments of the inventive concepts are not limited thereto.

Those skilled in the art will appreciate that many variations and modifications can be made to the preferred embodiments without substantially departing from the principles of the inventive concepts. Therefore, the disclosed embodiments of the inventive concepts described herein are used in a generic and descriptive sense only and not for purposes of limitation.

What is claimed is:

1. An image sensor, comprising:
   an active pixel electrically connected to a column line and configured to provide an output voltage to a pixel node; and
   a bias circuit electrically connected between the pixel node and an earth terminal, and in which a first current flows through a first line electrically connected to the pixel node,
   wherein the bias circuit comprises a first variable capacitor electrically connected to a power supply voltage, and a second variable capacitor electrically connected to the earth terminal,
   wherein a magnitude of the first current is configured to vary based on a ratio of a capacitance of the first variable capacitor to a capacitance of the second variable capacitor, and
   wherein the output voltage is configured to be adjusted based on the magnitude of the first current.

2. The image sensor of claim 1,
   wherein the bias circuit comprises a first current mirror configured to receive the first current from the column line,
   wherein the first current mirror comprises a first transistor electrically connected to the column line, and a second transistor electrically connected to the first transistor through a first bias node.

3. The image sensor of claim 2,
   wherein the first variable capacitor is electrically connected between the power supply voltage and the first bias node, and
   the second variable capacitor is electrically connected between the earth terminal and the first bias node.

4. The image sensor of claim 2,
   wherein the first current mirror further comprises a switch electrically connected between the first bias node and the second transistor,
   wherein the switch is configured to charge the first variable capacitor and the second variable capacitor with an electric current when the switch is turned on, and is configured to disconnect the first bias node and the second transistor when the switch is turned off.

5. The image sensor of claim 2, wherein the bias circuit further comprises a second current mirror configured to provide a second current to the second transistor, wherein the second current mirror comprises a third transistor electrically connected to the second transistor, and a fourth transistor electrically connected to the third transistor through a second bias node.

6. The image sensor of claim 5, wherein the second current mirror further comprises a switch electrically connected between the second bias node and the fourth transistor, wherein the first variable capacitor is electrically connected between the second bias node and the power supply voltage, wherein the second variable capacitor is electrically connected between the second bias node and the earth terminal, and wherein the switch is configured to charge the first variable capacitor and the second variable capacitor with an electric current when the switch is turned on, and is configured to disconnect the first bias node and the second transistor when the switch is turned off.

7. The image sensor of claim 5, further comprising: a third capacitor electrically connected between the power supply voltage and the first bias node, and a fourth capacitor electrically connected between the earth terminal and the first bias node.

8. The image sensor of claim 7, wherein a phase of a voltage of the first bias node is configured to vary based on a ratio of a capacitance of the third capacitor and a capacitance of the fourth capacitor, and wherein the output voltage is configured to be adjusted based on the phase of the voltage of the first bias node.

9. The image sensor of claim 5, wherein the bias circuit further comprises a third current mirror configured to provide a third current to the second transistor, wherein the third current mirror comprises a fifth transistor electrically connected to the fourth transistor, a sixth transistor electrically connected to the fifth transistor through a third bias node, and a switch electrically connected between the third bias node and the sixth transistor, wherein the first variable capacitor is electrically connected between the third bias node and the power supply voltage, wherein the second variable capacitor is electrically connected between the third bias node and the earth terminal, and wherein the switch is configured to charge the first variable capacitor and the second variable capacitor with an electric current when the switch is turned on, and is configured to disconnect the first bias node and the second transistor when the switch is turned off.

10. The image sensor of claim 1, wherein the capacitance of the first variable capacitor and the capacitance of the second variable capacitor are selected based on a variation of response of the output voltage of the pixel node to a ripple voltage of the power supply voltage.

11. An image sensor, comprising: a column line electrically connected to output nodes of a plurality of active pixels; and a bias circuit electrically connected to the column line, wherein the bias circuit comprises a first variable capacitor and a second variable capacitor electrically connected to each other, other sides of which are respectively electrically connected to a first voltage and a second voltage, the bias circuit being configured to generate a compensation voltage configured to compensate for a ripple voltage of a power supply voltage and the bias circuit being further configured to supply the compensation voltage to the output nodes, wherein the bias circuit further comprises a current mirror electrically connected to the output nodes, and wherein the current mirror comprises a first transistor electrically connected to the output nodes, and a second transistor electrically connected to the first transistor through a bias node.

12. The image sensor of claim 11, wherein the first voltage is the power supply voltage and the second voltage is an earth voltage.

13. The image sensor of claim 11, wherein the first variable capacitor is electrically connected between the bias node and the first voltage, and the second variable capacitor is electrically connected between the bias node and the second voltage.

14. The image sensor of claim 11, wherein a magnitude of the compensation voltage is based on a ratio of a capacitance of the second variable capacitor to a capacitance of the first variable capacitor, and a phase of the compensation voltage is opposite to a phase of the ripple voltage of the power supply voltage.

15. An image sensor comprising: a plurality of pixels electrically connected to a power supply voltage and are configured to output an output voltage to a pixel node via a column line; and a bias circuit configured to vary a bias current based on a ripple voltage of the power supply voltage and configured to provide the varied bias current to the pixel node, the bias circuit comprising a first capacitor electrically connected between the power supply voltage and a first node and a second capacitor electrically connected between an earth terminal and the first node, at least one of the first and second capacitors being a variable capacitor configured to adjust a magnitude of variance of the bias current.

16. The image sensor of claim 15, wherein the bias circuit further comprises: a first current mirror that comprises the first node and is configured to provide a first mirrored current; and a second current mirror that comprises a second node and is configured to provide the bias current based on the first mirrored current, wherein the second current mirror comprises a third capacitor electrically connected between the power supply voltage and the second node and a fourth capacitor electrically connected between an earth terminal and the second node, and wherein at least one of the third and fourth capacitors is a variable capacitor configured to adjust a phase of the variance of the bias current.

17. The image sensor of claim 15, wherein the bias circuit comprises a current mirror that comprises the first node and is configured to provide the bias current.

18. The image sensor of claim 15, wherein the bias circuit comprises:

a first current mirror that comprises the first node and is configured to provide a first mirrored current; and a second current mirror configured to provide the bias current based on the first mirrored current.

19. The image sensor of claim 15, wherein the variance of the bias current provides compensation for the ripple voltage of the power supply voltage.

\* \* \* \* \*